United States Patent
Watanabe (10) Patent No.: US 11,607,829 B2
(45) Date of Patent: Mar. 21, 2023

(54) CORE MOLDING DEVICE

(71) Applicant: TOYOTA JIDOSHA KABUSHIKI KAISHA, Toyota (JP)

(72) Inventor: Hirotsune Watanabe, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/105,907

(22) Filed: Nov. 27, 2020

(65) Prior Publication Data

US 2021/0283809 A1 Sep. 16, 2021

(30) Foreign Application Priority Data

Mar. 16, 2020 (JP) .............................. JP2020-044986

(51) Int. Cl.
  *B29C 45/78* (2006.01)
  *B29C 45/27* (2006.01)

(52) U.S. Cl.
  CPC .......... *B29C 45/2703* (2013.01); *B29C 45/78* (2013.01); *B29C 2045/2729* (2013.01)

(58) Field of Classification Search
  CPC ..... B29C 45/27; B29C 45/2703; B29C 45/26; B29C 45/02; B29C 45/0046; B29C 2045/0049; B29C 2045/2651; B29C 2045/2683; B29C 2045/0031; B29C 45/1639; B29C 45/36
  See application file for complete search history.

(56) References Cited

U.S. PATENT DOCUMENTS

| 2007/0196529 | A1 | 8/2007 | Zenpo et al. |
| 2010/0001424 | A1 | 1/2010 | Zenpo et al. |
| 2012/0156323 | A1* | 6/2012 | MacLeod ............ B29C 45/2727 425/562 |
| 2016/0185021 | A1* | 6/2016 | Olaru ..................... B29C 45/78 425/144 |
| 2016/0228942 | A1* | 8/2016 | Maegawa ............... B22C 9/046 |
| 2019/0344486 | A1* | 11/2019 | Ichiki .................... B29C 44/422 |

FOREIGN PATENT DOCUMENTS

| CN | 105705267 A | 6/2016 |
| JP | 2007160354 A | 6/2007 |
| JP | 4428385 B2 | 3/2010 |
| JP | 2015-085351 A | 5/2015 |
| JP | 2017148836 A | 8/2017 |

* cited by examiner

*Primary Examiner* — Alison L Hindenlang
*Assistant Examiner* — Debjani Roy
(74) *Attorney, Agent, or Firm* — Oliff PLC (57) ABSTRACT

A cavity includes a first cavity portion, and a second cavity portion that is formed between the first cavity portion and a runner and that corresponds to a baseboard. There is adopted a configuration in which a foamed admixture is supplied to the first cavity portion via the second cavity portion upon being supplied to the cavity via the runner. A collision portion with which the foamed admixture supplied to the cavity can collide before reaching the first cavity portion is formed at the second cavity portion.

2 Claims, 5 Drawing Sheets

CORE MOLDING DEVICE

CROSS-REFERENCE TO RELATED APPLICATION

This application claims priority to Japanese Patent Application No. 2020-044986 filed on Mar. 16, 2020, incorporated herein by reference in its entirety.

BACKGROUND

1. Technical Field

The disclosure relates to a core molding device.

2. Description of Related Art

Japanese Unexamined Patent Application Publication No. 2015-85351 (JP 2015-85351 A) discloses a casting die shaping device that is equipped with a housing tank that has a plurality of injection ports and that houses a foamed admixture, a molding die that has a plurality of runners into which the foamed admixture is introduced from the injection ports of the housing tank respectively and which correspond to the injection ports respectively, and that forms a cavity for molding the introduced foamed admixture into a casting die assuming a predetermined shape, and pressurization means for pressurizing the foamed admixture in the housing tank and injecting the foamed admixture into the cavity via the runners of the molding die.

SUMMARY

In the configuration of JP 2015-85351 A, the foamed admixture may directly collide with an inner surface of the cavity, and a binder of the foamed admixture may adhere thereto in a concentrated and hardened state.

It is an object of the disclosure to provide an art of restraining a binder of a foamed admixture from adhering, in a concentrated and hardened state, to an inner surface of a cavity.

There is provided a core molding device that molds a core including at least one core body and a baseboard. The core molding device is equipped with a molding die that has a cavity complementary to the core, and a runner communicating with the cavity, and a material supply unit that supplies a foamed admixture to the runner of the molding die. The cavity includes at least one first cavity portion corresponding to the at least one core body, and a second cavity portion that is formed between the at least one first cavity portion and the runner and that corresponds to the baseboard. There is adopted a configuration in which the foamed admixture is supplied to the at least one first cavity portion via the second cavity portion upon being supplied to the cavity via the runner. At least one collision portion with which the foamed admixture supplied to the cavity is able to collide before reaching the at least one first cavity portion is formed at the second cavity portion. According to the foregoing configuration, the foamed admixture supplied to the cavity does not directly collide with the at least one first cavity portion, so a binder of the foamed admixture can be restrained from adhering, in a concentrated and hardened state, to an inner surface of the at least one first cavity portion. The at least one collision portion may be arranged close to a discharge port of the runner. According to the foregoing configuration, the foamed admixture supplied to the cavity can be reliably caused to collide with the at least one collision portion before reaching the at least one first cavity portion. The at least one collision portion and the at least one first cavity portion may be aligned in this sequence along a discharge direction of the runner. According to the foregoing configuration, the foamed admixture supplied to the cavity is more reliably prevented from directly colliding with the at least one first cavity portion. The at least one collision portion may be formed in such a manner as to protrude from at least one of two opposed inner surfaces of the second cavity portion toward the other. According to the foregoing configuration, the at least one collision portion can be realized with a simple configuration. The core molding device may be further equipped with at least one heating unit that heats the molding die, a control unit that controls the at least one heating unit, and a measurement unit that is arranged at the at least one collision portion to measure a temperature of the at least one collision portion. The control unit may control the at least one heating unit based on a measurement result of the measurement unit. According to the foregoing configuration, the control of the at least one heating unit can be optimized. The control unit may control the at least one heating unit based on the measurement result of the measurement unit, in such a manner as to mitigate a fall in temperature of the at least one collision portion resulting from the supply of the foamed admixture to the cavity. According to the foregoing configuration, the temperature of the at least one collision portion is restrained from falling. The at least one collision portion may be formed such that the foamed admixture that has collided with the at least one collision portion bounces back toward the discharge port of the runner. According to the foregoing configuration, the swiftness with which the foamed admixture supplied to the cavity collides with the at least one collision portion is reduced, so the binder of the foamed admixture can be restrained from adhering, in a concentrated and hardened state, to the at least one collision portion. The at least one collision portion may have an opposite surface facing the discharge port of the runner, and the opposite surface may be recessed in a direction away from the discharge port of the runner. According to the foregoing configuration, the at least one collision portion having the function of causing the foamed admixture to bounce back toward the discharge port of the runner can be realized with a simple configuration. The at least one first cavity portion may include a plurality of first cavity portions. The at least one collision portion may include a plurality of collision portions, and the collision portions may be formed apart from one another in such a manner as to correspond to the first cavity portions respectively. According to the foregoing configuration, the foamed admixture can be appropriately supplied to the first cavity portions.

The disclosure can restrain the binder of the foamed admixture from adhering, in a concentrated and hardened state, to the inner surface of the at least one first cavity portion.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

The first embodiment will be described hereinafter with reference to FIGS. 1 to 3.

Figure 1:
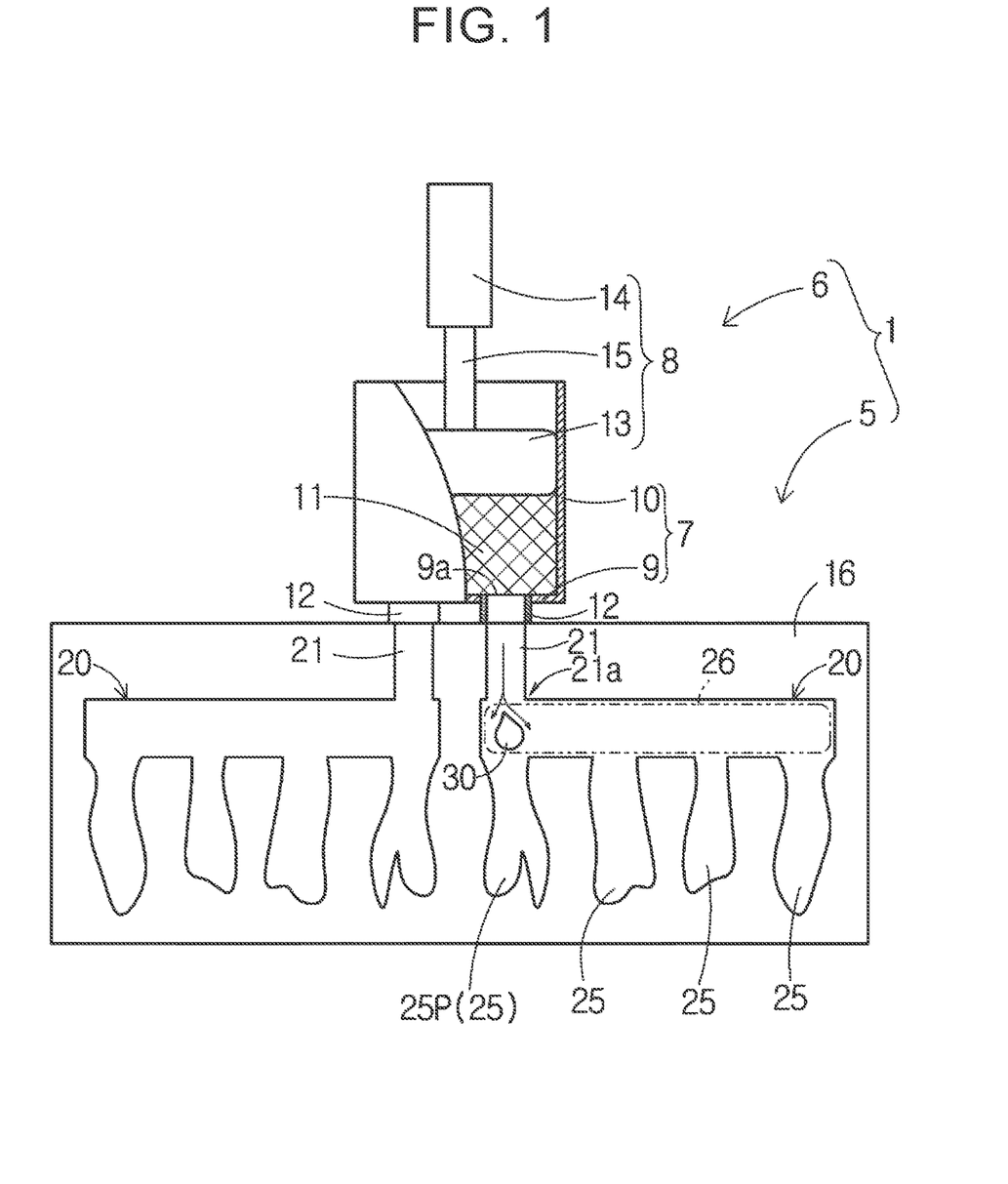
FIG. 1 is a front view of a core molding device in which a movable die constituting a molding die is not depicted for the sake of convenience of explanation (first embodiment)
Figure 2:
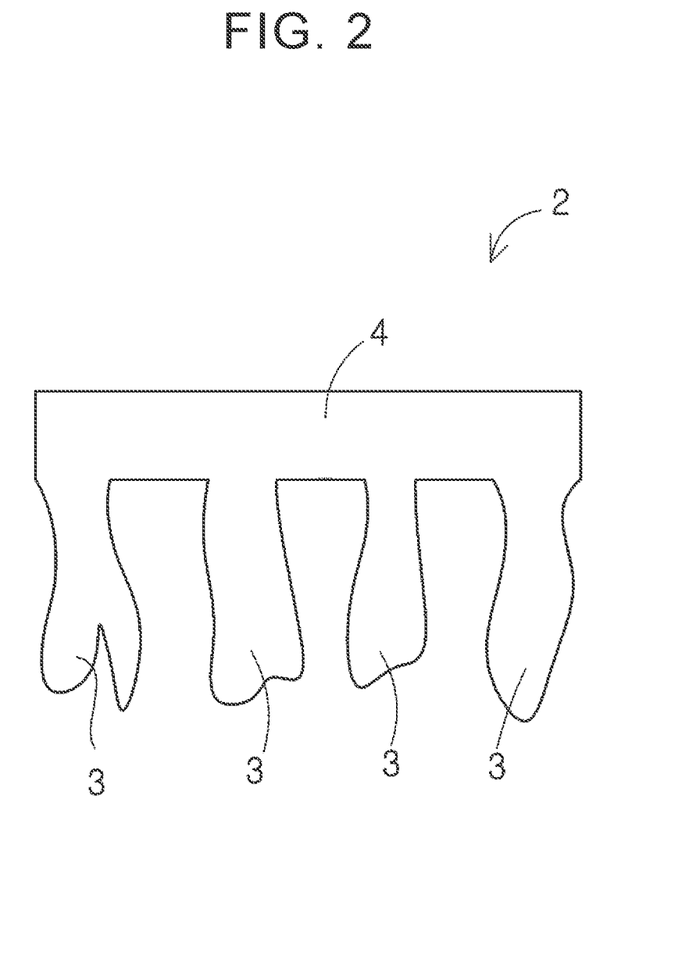
FIG. 2 is a front view of a core (first embodiment)

FIG. 1 shows a core molding device 1. FIG. 2 shows a core 2 molded by the core molding device 1.

A casting die used in casting a cast product having undercuts, for example, a cylinder block includes a core corresponding to the undercuts, as well as a fixed die and a movable die. As shown in FIG. 2, a core 2 may include a plurality of core bodies 3 and a baseboard 4. Each of the core bodies 3 is a part for forming the corresponding one of the undercuts of the cylinder block, and has a shape complementary to the corresponding one of the undercuts. The core 2 may include only the single core body 3, instead of including the core bodies 3. The baseboard 4 is a part for coupling the core bodies 3 to the fixed die or the movable die. That is, by attaching the baseboard 4 to the fixed die or the movable die, the core bodies 3 are supported by the fixed die or the movable die. The core 2 exemplified in FIG. 2 is configured such that the core bodies 3 protrude from the baseboard 4 extending like a prism, in the same direction separately from one another like sticks. However, the shape of the core 2 is not limited as shown in FIG. 2.

As described above, the core 2 is used as part of the casting die for casting the cast product. Accordingly, the core 2 can be referred to also as the casting die. In contrast, a die for molding the core 2 itself is constantly referred to as a molding die in the present specification, so as to be distinguished from the casting die for casting the cast product.

Referring again to FIG. 1, the core molding device 1 is a device for molding the core 2. The core molding device 1 includes a molding die 5 and a material supply unit 6.

The material supply unit 6 includes a housing tank 7 and a pressurization unit 8.

The housing tank 7 assumes the shape of a bottomed cylinder including a bottom plate 9 and a cylindrical lateral wall 10, and is configured to be able to house a foamed admixture 11. Two discharge ports 9a are formed through the bottom plate 9. Injection nozzles 12 are attached to the discharge ports 9a respectively.

The foamed admixture 11 will now be described. The foamed admixture 11 is obtained by stirring a granular aggregate, a water-soluble binder, water, and other additives, and has properties of being thermally hardened by being heated to, for example, about 230 to 300° C. The granular aggregate is typically silica sand. The water-soluble binder is a so-called caking agent, and is, for example, an inorganic material such as clay, cement, or liquid glass, or an organic material such as phenol resin or furan resin.

The pressurization unit 8 is designed to inject the foamed admixture 11 from the respective discharge ports 9a by pressurizing the foamed admixture 11 housed in the housing tank 7. The pressurization unit 8 is constituted of a piston 13 housed in the housing tank 7, a hydraulic cylinder 14, and a rod 15 that is driven in a reciprocating manner by the hydraulic cylinder 14 and that is coupled to the piston 13.

Figure 3:
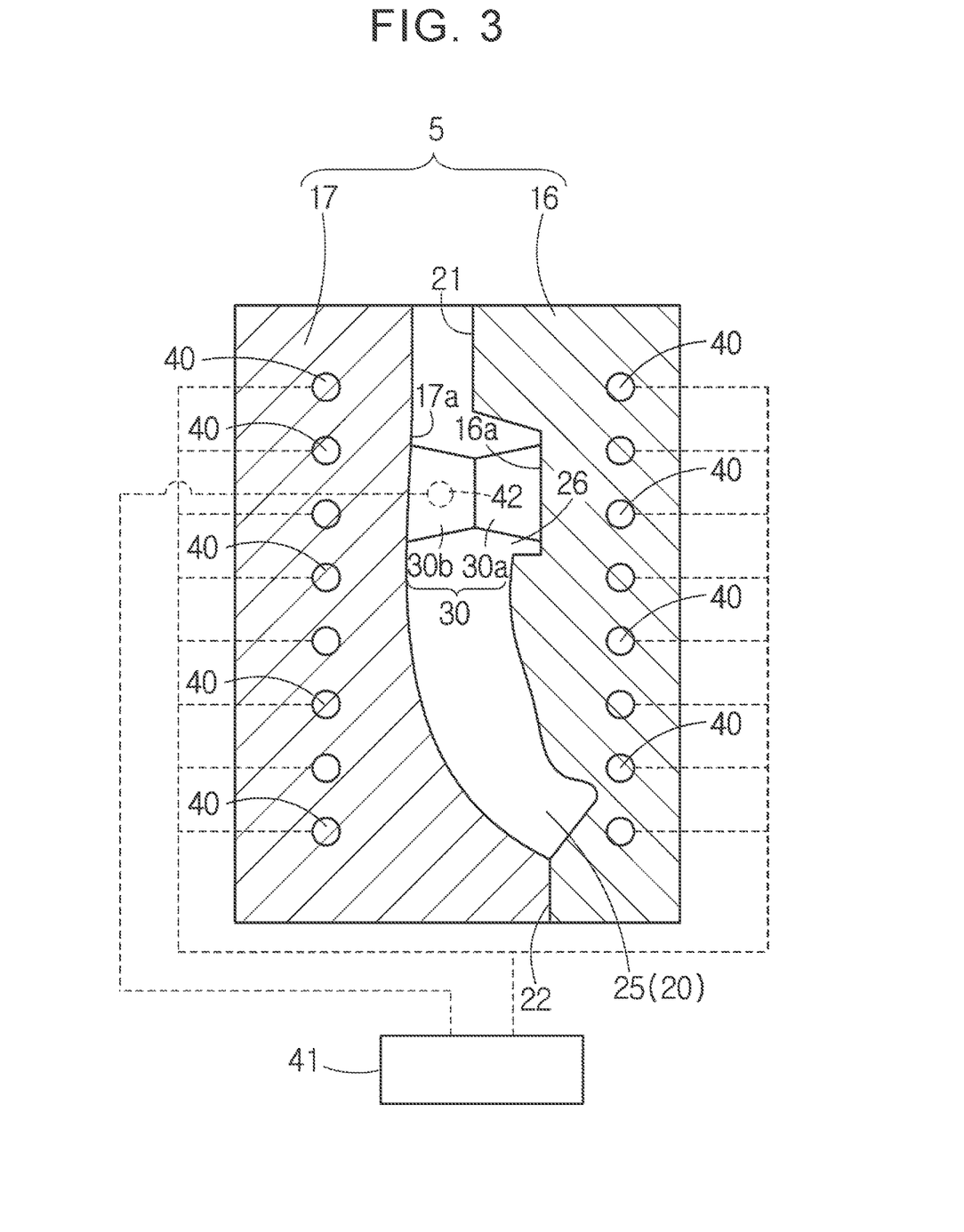
FIG. 3 is a lateral cross-sectional view of the molding die (first embodiment)

As shown in FIG. 3, the molding die 5 includes a fixed die 16 and a movable die 17. In FIG. 1, for the sake of convenience of explanation, the movable die 17 located on the near side when the sheet is viewed is not depicted. As shown in FIG. 1, the molding die 5 has two cavities 20 complementary to cores 2 respectively, and two runners 21. One of the cavities 20 communicates with one of the runners 21, whereas the other cavity 20 communicates with the other runner 21. The runners 21 communicate with the injection nozzles 12 respectively. In this manner, the molding die 5 has the two cavities 20 and the two runners 21, and thus is configured to be able to mold the two cores 2 at the same time. The two cavities 20 and the two runners 21 are identical in shape respectively. Therefore, only one of the cavities 20 and only one of the runners 21 will be described hereinafter, and the description of other configurational details will be omitted.

As shown in FIG. 3, a mating surface 22 (a dividing surface) of the fixed die 16 and the movable die 17 is parallel to a direction of pressurization by the pressurization unit 8. That is, the mating surface 22 is parallel to the discharge direction of the runner 21.

Referring again to FIG. 1, the cavity 20 includes a plurality of first cavity portions 25 corresponding to the core bodies 3 respectively, and a second cavity portion 26 corresponding to the baseboard 4.

The second cavity portion 26 is formed between the first cavity portions 25 and the runner 21. Accordingly, there is adopted a configuration in which the foamed admixture 11 is supplied to the first cavity portions 25 via the second cavity portion 26 upon being supplied to the cavity 20 via the runner 21.

In the present embodiment, a first cavity portion 25P as that one of the first cavity portions 25 which is formed closest to the runner 21 is formed in the discharge direction of the runner 21. That is, the runner 21 and the first cavity portion 25P are formed on a straight line. In other words, the first cavity portion 25P is formed on an extended line of a central axis of the runner 21. Accordingly, the foamed admixture 11 discharged from the runner 21 is swiftly supplied to the first cavity portion 25P, and collides with an inner surface of the first cavity portion 25P.

As a result of strenuous studies, the inventor of the present application has obtained the knowledge that the adhesion of stains to the inner surface of the first cavity portion 25P occurs due to the above-mentioned collision. It should be noted herein that the adhesion of stains means that the water-soluble binder constituting the foamed admixture 11 adheres, in a concentrated and hardened state, to the inner surface of the first cavity portion 25P. This adhesion of stains causes various problems. That is, the core 2 is damaged due to a demolding failure in, for example, taking out the molded core 2 from the molding die 5. Besides, when the core 2 is taken out from the molding die 5, the concentrated and hardened binder may adhere to the surface of the core 2. In this case, when the cast product is cast through the use of the core 2, gas is generated as a result of the binder, so a casting failure may be caused.

Thus, in the present embodiment, a collision portion 30 with which the foamed admixture 11 supplied to the cavity 20 can collide before reaching the first cavity portion 25P is formed at the second cavity portion 26. The collision portion 30 is arranged close to the discharge port 21a of the runner 21. More specifically, the collision portion 30 and the first cavity portion 25P are aligned in this sequence along the discharge direction of the runner 21. As shown in FIG. 3, the collision portion 30 is constituted of a fixed die-side collision portion 30a and a movable die-side collision portion 30b. The fixed die 16 has a fixed die-side defining surface 16a that defines the second cavity portion 26 in a die clamping direction of the molding die 5. The fixed die-side defining surface 16a is a surface facing the movable die 17. The movable die 17 has a movable die-side defining surface 17a that defines the second cavity portion 26 in the die clamping direction of the molding die 5. The movable die-side defining surface 17a is a surface facing the fixed die 16. The fixed die-side defining surface 16a and the movable die-side defining surface 17a face each other in the die clamping direction of the molding die 5. The fixed die-side collision portion 30a protrudes from the fixed die-side defining surface 16a toward the movable die-side defining surface 17a. The fixed die-side collision portion 30a protrudes in such a manner as to be slightly tapered toward the movable die-side defining surface 17a, in consideration of a draft angle. The movable die-side collision portion 30b protrudes from the movable die-side defining surface 17a toward the fixed die-side defining surface 16a. The movable die-side collision portion 30b protrudes in such a manner as to be slightly tapered toward the fixed die-side defining surface 16a, in consideration of the draft angle. Then, in a die clamping state of the molding die 5 shown in FIG. 3, the fixed die-side collision portion 30a and the movable die-side collision portion 30b are butted against each other in the die clamping direction of the molding die 5. Thus, the collision portion 30 extends in a columnar manner between the fixed die-side defining surface 16a and the movable die-side defining surface 17a in such a manner as to couple the fixed die-side defining surface 16a and the movable die-side defining surface 17a to each other in the die clamping state of the molding die 5. Incidentally, the collision portion 30 is not limited in shape. For example, there may be a gap between the fixed die-side collision portion 30a and the movable die-side collision portion 30b in the die clamping state of the molding die 5, and the fixed die-side collision portion 30a or the movable die-side collision portion 30b may be dispensed with.

Referring again to FIG. 1, due to the provision of the collision portion 30, the foamed admixture discharged from the runner 21 is scattered in many directions through a collision with the collision portion 30, and is supplied to the first cavity portion 25P with most of its kinetic energy lost, instead of being supplied to the first cavity portion 25P while maintaining its kinetic energy. Thus, the foamed admixture 11 does not swiftly collide with the inner surface of the first cavity portion 25P, so the adhesion of stains to the inner surface of the first cavity portion 25P can be effectively suppressed.

Incidentally, the foamed admixture 11 swiftly collides with the collision portion 30 instead of swiftly colliding with the inner surface of the first cavity portion 25P. Accordingly, the adhesion of stains to the collision portion 30 occurs. In this case, the concentrated and hardened water-soluble binder may adhere to the baseboard 4. However, the baseboard 4 is a part that does not come into direct contact with the cast product in casting the cast product, and hence does not cause a deterioration in quality of the cast product.

By the way, as shown in FIG. 3, the core molding device 1 further includes a plurality of heating units 40, a control unit 41, and a measurement unit 42.

The heating units 40 are embedded in the fixed die 16 and the movable die 17, and heat the fixed die 16 and the movable die 17 to thermally harden the foamed admixture 11 supplied to the cavity 20. As shown in FIG. 3, the heating units 40 are arranged in a scattered manner over a wide range so as to be able to evenly heat the fixed die 16 and the movable die 17.

The control unit 41 is configured to be able to control heat generation amounts of the heating units 40 individually, by, for example, controlling values of currents supplied to the heating units 40 individually.

The measurement unit 42 is embedded in the movable die-side collision portion 30b of the collision portion 30 to measure a temperature of the movable die-side collision portion 30b and output a result of measurement to the control unit 41. The measurement unit 42 may be embedded in the fixed die-side collision portion 30a of the collision portion 30 to measure a temperature of the fixed die-side collision portion 30a and output a result of measurement to the control unit 41.

Moreover, the control unit 41 is configured to individually control the heat generation amounts of the heating units 40, based on the result of measurement of the collision portion 30. In concrete terms, the temperature of the collision portion 30 is more likely to fall than the temperatures of the fixed die 16 and the movable die 17, due to a collision with the foamed admixture 11 substantially at room temperature. Accordingly, the foamed admixture 11 is unlikely to be thermally hardened around the collision portion 30. Thus, the control unit 41 controls the heat generation amounts of the heating units 40 individually, based on a result of measurement by the measurement unit 42, so as to restrain the temperature of the collision portion 30 from falling. Thus, when the temperature of the collision portion 30 falls due to a collision with the foamed admixture 11, the heat generation amount of the heating unit 40 arranged close to the collision portion 30 is larger than the heat generation amounts of the other heating units 40, so the temperature of the collision portion 30 is restrained from falling.

The first embodiment described above has the following features.

The core molding device 1 is a device that molds the core 2 including the at least one core body 3 and the baseboard 4. The core molding device 1 is equipped with the molding die 5 having the cavity 20 complementary to the core 2 and the runner 21 communicating with the cavity 20, and the material supply unit 6 that supplies the foamed admixture 11 to the runner 21 of the molding die 5. The cavity 20 includes the first cavity portion 25P and the second cavity portion 26 that is formed between the first cavity portion 25P and the runner 21 and that corresponds to the baseboard 4. There is adopted a configuration in which the foamed admixture 11 is supplied to the first cavity portion 25P via the second cavity portion 26 upon being supplied to the cavity 20 via the runner 21. The collision portion 30 with which the foamed admixture 11 supplied to the cavity 20 can collide before reaching the first cavity portion 25P is formed at the second cavity portion 26. According to the foregoing configuration, the foamed admixture 11 supplied to the cavity 20 does not directly collide with the first cavity portion 25P, so the binder of the foamed admixture 11 can be restrained from adhering, in a concentrated and hardened state, to the inner surface of the first cavity portion 25P.

Incidentally, in the present embodiment, the cavity 20 includes the first cavity portions 25, but may be configured to include only the single first cavity portion 25. Besides, although only the single collision portion 30 is formed in the second cavity portion 26 in the present embodiment, a plurality of collision portions 30 may be formed in the second cavity portion 26.

Besides, at least one of the collision portions 30 is arranged close to the discharge port 21a of the runner 21. According to the foregoing configuration, the foamed admixture 11 supplied to the cavity 20 can be reliably caused to collide with the collision portion 30 before reaching the first cavity portion 25P.

Besides, the collision portion 30 and the first cavity portion 25P are aligned in this sequence along the discharge direction of the runner 21. According to the foregoing configuration, the foamed admixture 11 supplied to the cavity 20 is more reliably prevented from directly colliding with the first cavity portion 25P.

Besides, the collision portion 30 is formed in such a manner as to protrude from at least one of two opposed inner surfaces (the fixed die-side defining surface 16a and the movable die-side defining surface 17a) of the second cavity portion 26 toward the other. According to the foregoing configuration, the collision portion 30 can be realized with a simple configuration.

Besides, the core molding device 1 is further equipped with the heating units 40 that heat the molding die 5, the control unit 41 that controls the heating units 40, and the measurement unit 42 that is arranged at the collision portion 30 to measure the temperature of the collision portion 30. The control unit 41 controls the heating units 40 based on the result of measurement by the measurement unit 42. According to the foregoing configuration, the control of the heating units 40 can be optimized. Incidentally, the core molding device 1 may include only the single heating unit 40 instead of including the heating units 40.

Besides, the control unit 41 controls the heating units 40 based on the result of measurement by the measurement unit 42, in such a manner as to restrain the temperature of the collision portion 30 from falling through the supply of the foamed admixture 11 to the cavity 20. According to the foregoing configuration, the temperature of the collision portion 30 is restrained from falling.

Second Embodiment

The second embodiment will be described hereinafter with reference to FIG. 4. The following description will focus on the difference between the present embodiment and the first embodiment, and redundant description will be omitted.

Figure 4:
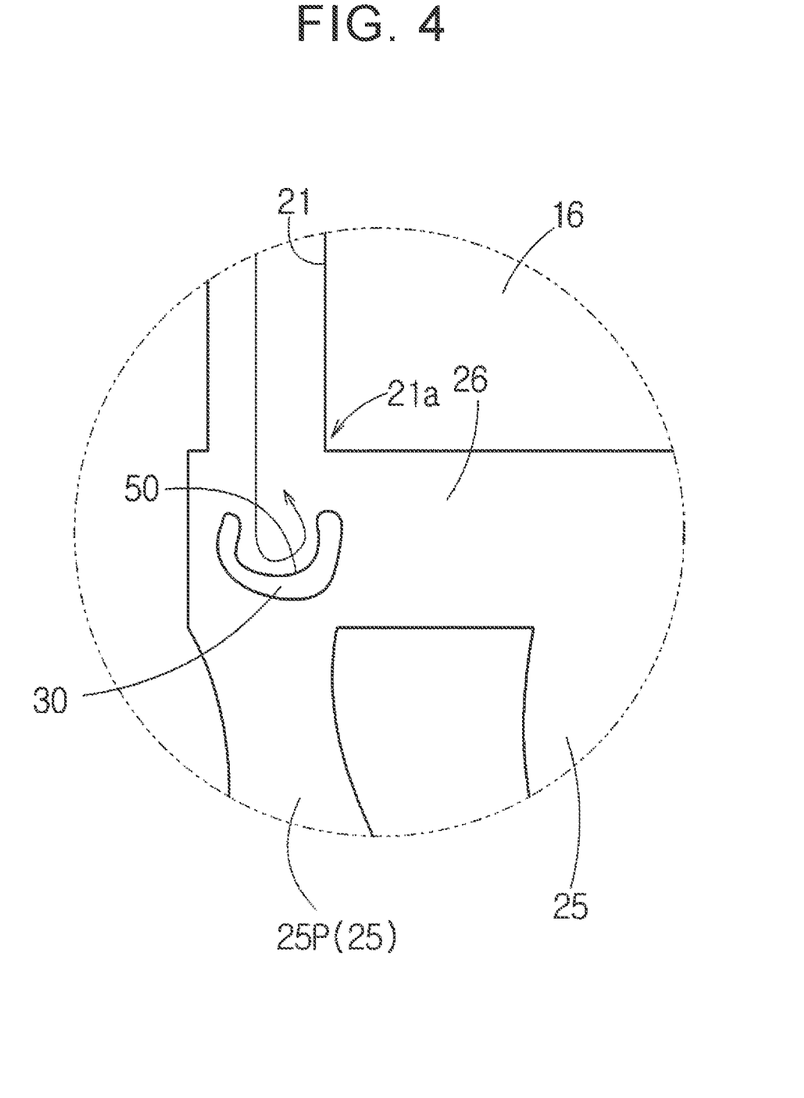
FIG. 4 is a partial front view of a molding die in which a movable die constituting the molding die is not depicted for the sake of convenience of explanation (second embodiment)

As shown in FIG. 4, in the present embodiment, the collision portion 30 is formed such that the foamed admixture 11 that has collided with the collision portion 30 bounces back toward the discharge port 21a of the runner 21. According to the foregoing configuration, the foamed admixture 11 supplied to the cavity 20 collides with the foamed admixture 11 that has bounced back from the collision portion 30 before colliding with the collision portion 30, so the swiftness with which the foamed admixture 11 supplied to the cavity 20 collides with the collision portion 30 is reduced. Accordingly, the water-soluble binder of the foamed admixture 11 can be restrained from adhering, in a concentrated and hardened state, to the collision portion 30.

In concrete terms, the collision portion 30 has an opposite surface 50 facing the discharge port 21a of the runner 21. The opposite surface 50 is recessed in a direction away from the discharge port 21a of the runner 21. According to the foregoing configuration, the collision portion 30 having the function of causing the foamed admixture 11 to bounce back toward the discharge port 21a of the runner 21 can be realized with a simple configuration.

Third Embodiment

Figure 5:
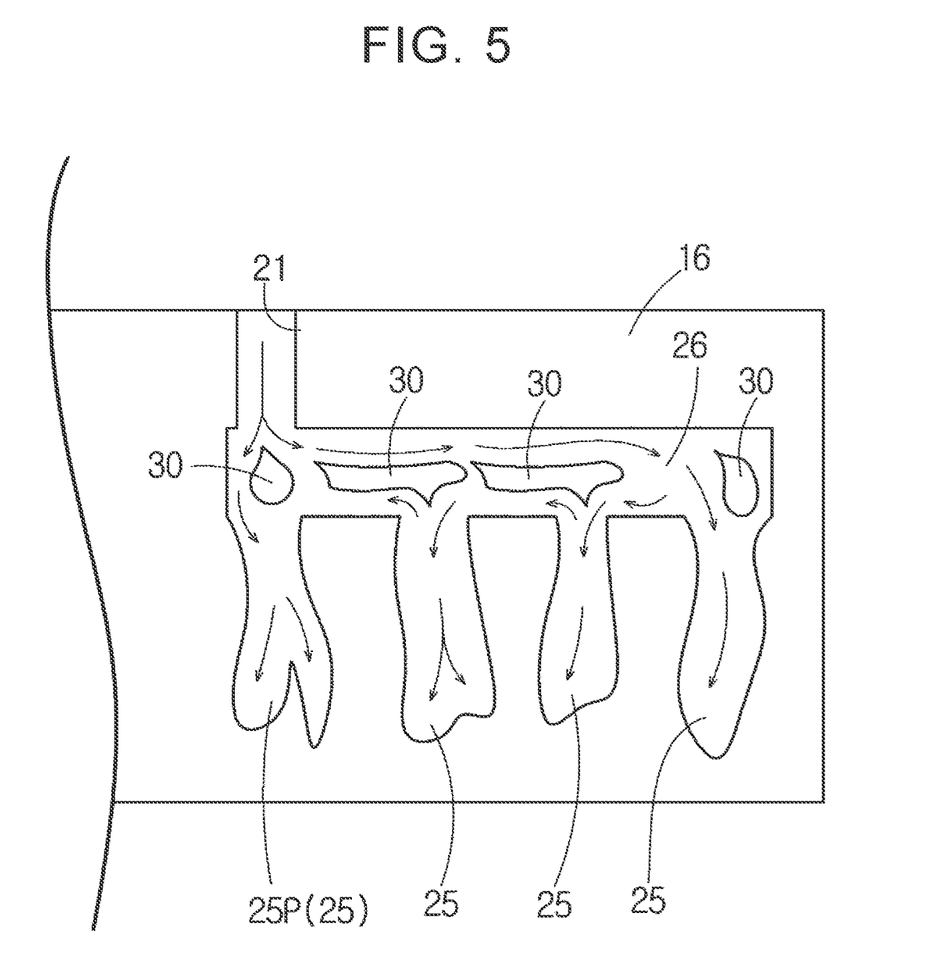
FIG. 5 is a partial front view of a molding die in which a movable die constituting the molding die is not depicted for the sake of convenience of explanation (third embodiment).

The third embodiment will be described hereinafter with reference to FIG. 5. The following description will focus on the difference between the present embodiment and the first embodiment, and redundant description will be omitted.

In the present embodiment, a plurality of collision portions 30 are formed in the second cavity portion 26. The collision portions 30 are formed separately from one another in the longitudinal direction of the second cavity portion 26 in such a manner as to correspond to the first cavity portions 25 respectively. The statement that the collision portions 30 correspond to the first cavity portions 25 respectively means, for example, that the collision portions 30 and the first cavity portions 25 are equal in number, and that the collision portions 30 and the first cavity portions 25 are arranged facing each other respectively. According to the foregoing configuration, a plurality of discharge ports are substantially formed in the second cavity portion 26, so the foamed admixture 11 can be appropriately supplied to the first cavity portions 25. That is, in the present embodiment, the collision portions 30 exert a straightening effect of appropriately controlling the flow of the foamed admixture 11 in the entire second cavity portion 26.

What is claimed is:

1. A core molding device that molds a core including at least one core body and a baseboard, the core molding device comprising:
   a molding die that has a cavity complementary to the core, and a runner communicating with the cavity; and
   a material supply unit that supplies a foamed admixture to the runner of the molding die,
   wherein the cavity includes at least one first cavity portion corresponding to the at least one core body, and a second cavity portion that is formed between the at least one first cavity portion and the runner and that corresponds to the baseboard,
   the foamed admixture is supplied to the at least one first cavity portion via the second cavity portion upon being supplied to the second cavity portion via the runner,
   at least one collision portion with which the foamed admixture supplied to the cavity is configured to collide before reaching the at least one first cavity portion is formed at the second cavity portion,
   the at least one collision portion is formed such that the foamed admixture that has collided with the at least one collision portion bounces back toward the discharge port of the runner,
   the at least one collision portion has an opposite surface facing the discharge port of the runner, and
   the opposite surface is recessed in a direction away from the discharge port of the runner.

2. A core molding device that molds a core including at least one core body and a baseboard, the core molding device comprising:
   a molding die that has a cavity complementary to the core, and a runner communicating with the cavity; and
   a material supply unit that supplies a foamed admixture to the runner of the molding die,
   wherein the cavity includes at least one first cavity portion corresponding to the at least one core body, and a second cavity portion that is formed between the at least one first cavity portion and the runner and that corresponds to the baseboard, the foamed admixture is supplied to the at least one first cavity portion via the second cavity portion upon being supplied to the second cavity portion via the runner, at least one collision portion with which the foamed admixture supplied to the cavity is configured to collide before reaching the at least one first cavity portion is formed at the second cavity portion, the at least one collision portion includes a fixed die side collision portion and a movable die side collision portion, and the fixed die side collision portion and the movable die side collision portion are butted against each other.

* * * * *